United States Patent
Driscoll et al.

(10) Patent No.: US 8,767,767 B2
(45) Date of Patent: Jul. 1, 2014

(54) SYSTEM AND METHOD FOR OUT-OF-BAND SIGNALING

(75) Inventors: Kevin R. Driscoll, Maple Grove, MN (US); Brendan Hall, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 233 days.

(21) Appl. No.: 13/401,390

(22) Filed: Feb. 21, 2012

(65) Prior Publication Data

US 2013/0215905 A1    Aug. 22, 2013

(51) Int. Cl.
*H04L 12/413* (2006.01)

(52) U.S. Cl.
USPC .............. 370/445; 341/50; 370/241

(58) Field of Classification Search
CPC ... H03M 7/00; H04L 12/413; H04L 12/4013; H04L 29/00; H04L 43/00; H04L 12/56; H04L 12/28; H04L 25/0262; H04L 25/4908; H04L 67/1097; H04J 3/06; H04J 3/0605; H04J 2203/0085; G06F 11/2092; G06F 3/0626; G06F 3/0658; G06F 3/0689
USPC ............... 370/445, 520, 509, 412, 241, 229, 370/395.32, 503, 504, 252, 395.2, 395.5; 341/50, 60; 375/242; 710/106
See application file for complete search history.

(56) References Cited

U.S. PATENT DOCUMENTS

| | | | |
|---|---|---|---|
| 7,372,859 B2 | 5/2008 | Hall et al. |
| 7,382,805 B1 | 6/2008 | Raza et al. |
| 7,502,334 B2 | 3/2009 | Hall et al. |
| 7,606,179 B2 | 10/2009 | Hall et al. |
| 7,649,835 B2 | 1/2010 | Hall et al. |
| 7,656,881 B2 | 2/2010 | Hall et al. |
| 7,656,905 B2 | 2/2010 | Sheth et al. |
| 7,668,084 B2 | 2/2010 | Driscoll et al. |
| 7,668,204 B2 | 2/2010 | Hall et al. |
| 7,693,078 B2 | 4/2010 | Gonda |
| 7,729,297 B2 | 6/2010 | Hall et al. |
| 7,778,159 B2 | 8/2010 | Driscoll et al. |
| 7,889,683 B2 | 2/2011 | Paulitsch et al. |

(Continued)

OTHER PUBLICATIONS

Hall et al., "System and Method for Integrity Reconstitution", "U.S. Patent application filed Feb. 21, 2012", pp. 1-32.

(Continued)

*Primary Examiner* — Charles C Jiang
*Assistant Examiner* — Walli Butt
(74) *Attorney, Agent, or Firm* — Fogg & Powers LLC

(57) ABSTRACT

A communication network comprises a communication medium and a plurality of nodes. Each node is configured to communicate with the other nodes using a protocol that has at least one of an idle period or a preamble period. The at least one node of the plurality of nodes is configured to transmit an out-of-band signal during at least one of the idle period or the preamble period and is configured to modify at least a portion of the out-of-band signal to communicate data to at least one other node. The at least one other node is configured to interpret the modified portion of the out-of-band signal to identify the data communicated in the modified out-of-band signal. The modified out-of-band signal complies with the protocol's encoding rules such that any node not configured to interpret the modified portion of the out-of-band signal processes the modified out-of-band signal according to the protocol.

20 Claims, 7 Drawing Sheets

(56) References Cited

U.S. PATENT DOCUMENTS

| | | |
|---|---|---|
| 7,912,094 B2 | 3/2011 | Hall et al. |
| 7,920,597 B2 | 4/2011 | Conway et al. |
| 7,995,621 B2 | 8/2011 | Aweya et al. |
| 8,130,773 B2 | 3/2012 | Hall et al. |
| 2005/0129037 A1 | 6/2005 | Zumsteg et al. |
| 2007/0189172 A1* | 8/2007 | Vedanabhatla et al. ....... 370/241 |
| 2008/0107024 A1 | 5/2008 | Driscoll et al. |
| 2008/0144526 A1* | 6/2008 | Hall et al. ..................... 370/254 |
| 2009/0116502 A1 | 5/2009 | Hall et al. |
| 2009/0295606 A1* | 12/2009 | Boles et al. .................... 341/50 |
| 2010/0014856 A1 | 1/2010 | Driscoll |
| 2010/0284301 A1 | 11/2010 | Paulitsch et al. |
| 2013/0182552 A1 | 7/2013 | Hall et al. |
| 2013/0219491 A1 | 8/2013 | Hall et al. |

OTHER PUBLICATIONS

Hall et al., "Virtual Pairing for Consistent Data Broadcast", "U.S. Appl. No. 13/350,304, filed Jan. 13, 2012", pp. 122.

* cited by examiner

SYSTEM AND METHOD FOR OUT-OF-BAND SIGNALING

BACKGROUND

Nodes in a communication network communicate with one another using a communication protocol. For example, the Ethernet family of technologies is a common protocol for Local Area Networks (LANs). These protocols set forth standards or requirements for the data format, such as the length of the transmitted frame or message, the length of any preamble, and minimum time required between frames. The time between frames is often referred to as an idle period.

SUMMARY

In one embodiment, a communication network is provided. The communication network comprises a communication medium; and a plurality of nodes. Each node is configured to communicate with the other nodes via the communication medium using a protocol that has at least one of an idle period after transmission of a frame or a preamble period prior to start of transmission of a frame. The at least one node of the plurality of nodes is configured to transmit an out-of-band signal during at least one of the idle period or the preamble period. The at least one node is configured to modify at least a portion of the out-of-band signal to communicate data to at least one other node. The at least one other node is configured to interpret the modified portion of the out-of-band signal to identify the data communicated in the modified out-of-band signal. The modified out-of-band signal complies with the protocol's encoding rules such that any node not configured to interpret the modified portion of the out-of-band signal processes the modified out-of-band signal according to the protocol.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
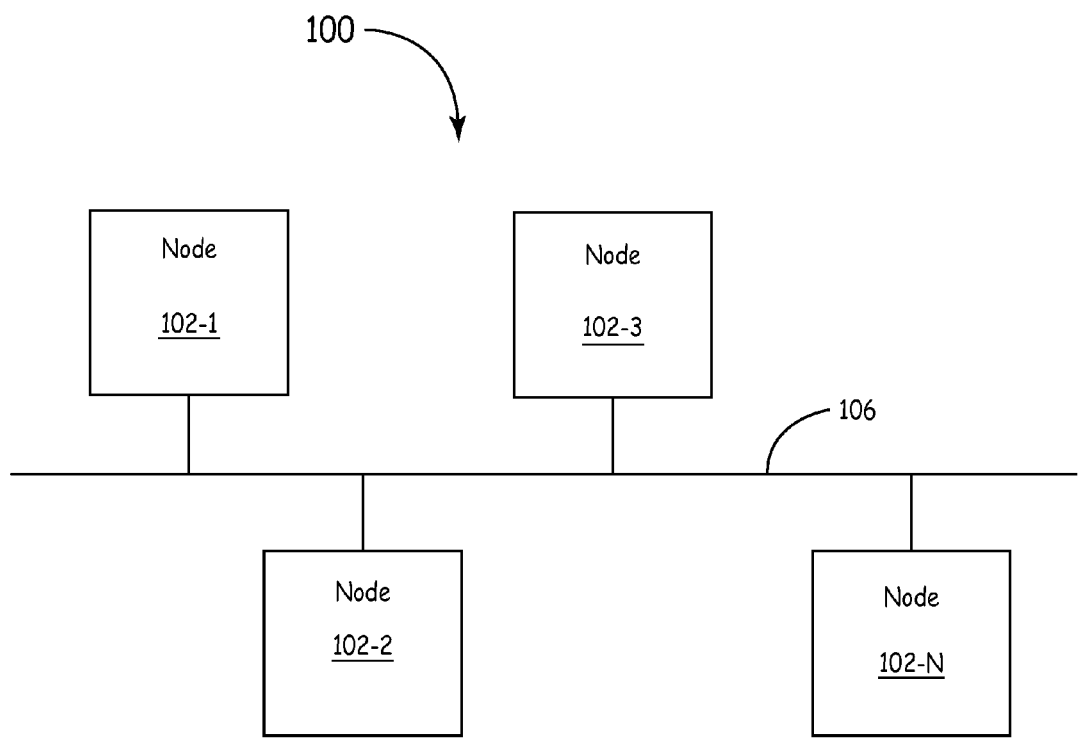
FIG. 1 is a block diagram of one embodiment of an exemplary network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one embodiment of an exemplary network 100. Network 100 includes a plurality of nodes 102-1 ... 102-N coupled together via a shared medium or bus 106, where N is the total number of nodes in network 100. Although four nodes are shown in FIG. 1, it is to be understood that any number of nodes can be used in other embodiments. For the sake of illustration, the details of nodes 102 are not shown in FIG. 1. However, it is understood that the nodes 102 are implemented using suitable hardware and/or software to implement the functionality described here as being performed by the nodes 102. Each such node 102 also includes a suitable network or other interface for communicatively coupling that node to the medium 106. One exemplary node is described in more detail with respect to FIG. 6.

Each node 102 communicates with the other nodes using a protocol that has a minimum idle period between frames. As used herein the term "frame" is defined as a block of data having an identifiable start and finish. The term frame is used herein interchangeably with the term "message." The size of each frame can vary from frame to frame. An out-of-band signal is defined to mean a signal that is transmitted during a period either before or after a frame. For example, a preamble period occurs prior to a bit or byte indicating a start of a frame and idle period occurs after a bit or byte indicating an end of a frame. Thus, an idle period, as used herein, is defined to mean a period of time after transmission of a frame during which a frame is not transmitted so nodes 102 can prepare for the transmission of the next frame. Hence, an idle signal is a signal transmitted during an idle period. In some conventional systems, a conventional idle signal also includes a period of no activity. Similar to an idle signal, a preamble signal is a signal transmitted during a preamble period. As used herein an out-of-band period, therefore, refers to either a preamble period or an idle period.

During the idle period a transmitting node 102 provides signals on the bus 106 to maintain polarity balance so that on average the same number of ones and zeros are sent. In addition, the signals transmitted during the idle period are used at the physical layer to maintain bit level synchronization between the nodes 102. In conventional systems, the signals transmitted during the idle period or preamble period are discarded. However, in the embodiments described herein, nodes 102 are configured to interpret modified portions of the idle signals and/or preamble signals transmitted during the idle period/preamble period to communicate additional data without decreasing the bandwidth allocated to the frames. In particular, a portion of the idle signal and/or preamble signal is modified in such a manner that the idle signal and/or preamble signal still complies with the corresponding protocol rules for idle signals or preamble signals, respectively, yet is identifiable by the nodes 102 as containing data. As used herein, complying with the protocol rules for idle signals and/or preamble signals means that the signal does not cause an error or increase an error count at the receiving node. In other words, the format and encoding, etc. of the idle signal and/or preamble signal does not violate any of the protocol rules for format, encoding, etc.

For example, in some embodiments, each of the nodes 102 communicates over the shared medium 106 using an Ethernet-based protocol, such as Ethernet POWERLINK, EtherCAT, and Time-triggered (TT) Ethernet. Discussion of Ethernet-based protocols herein refers to implementations of one or more of the family of IEEE 802.3 family of standards. In addition, EtherCAT, as used herein, also refers to an implementation of the specification published as IEC/PAS 62407. Similarly, Ethernet POWERLINK refers to an implementation of the protocol standard managed by the Ethernet POWERLINK Standardization Group.

In this embodiment, nodes 102 implement 1000 BASE-T Ethernet (also commonly referred to as gigabit Ethernet). In other embodiments, other implementations of Ethernet, such as, but not limited to, 10 BASE-T and 100 BASE-X (commonly referred to as Fast Ethernet) are used. To ensure proper communication between nodes 102 during an idle period, some implementations of Ethernet specify rules for the transmitted signals to maintain correct disparity (i.e. balance of ones and zeros) and maximum run length limit (RLL) (i.e. the maximum number of consecutive ones or zeros). Nodes 102 are configured to substitute conventional patterns of ones and zeros used in an idle period with other patterns of ones and zeros which are identifiable by the receiving nodes 102 as containing data and yet comply with the corresponding protocol's rules for idle signals. In this example, the bit substitutions used for out-of-band signaling and the interpretation (i.e. identification or reading) of these bits is done at points in the Ethernet protocol stack where insertions or deletions are not done to the idle sequence (e.g. in a PHY device below the Physical Coding Sublayer).

Hence, the data transmitted during the idle period does not interfere with the operation of network 100. Indeed, even if one of the nodes 102 is not configured to utilize or recognize data transmitted during the idle period, that node 102 will continue to operate properly since the substituted patterns comply with the rules for patterns during the idle period. Hence, the node not configured to interpret the modified portion of the idle signal, processes the idle signal according to the protocol as if the modified idle signal were a conventional idle signal.

For example, 1000 BASE-T Ethernet specifies a minimum idle period of 12 code-groups or octets. Each code-group contains 8 bits. The first two code groups contain a specific sequence of ones and zeros referred to as the end-of-frame delimiter. The next 10 code-groups are divided into 5 idle ordered sets. Each idle ordered set contains two code-groups. 1000 BASE-T specifies a particular sequence of bits for the first code-group in each ordered set. In particular, 1000 BASE-T utilizes 8b/10b encoding and the first code-group is specified as containing the K28.5 control symbol. The K28.5 control symbol contains either the sequence 0011111010 or 1100000101 depending on the running disparity (e.g. total disparity of all the transmitted code-groups) so that the overall disparity is zero (i.e. the same number of transmitted zeros as ones). The second code-group in each ordered set is typically either the data symbol D05.6 (1010010110) or D16.2 (0110110101 or 1001000101 depending on the running disparity. As used herein, the term "standard code-group" refers to a code-group that is either explicitly required in the corresponding protocol or a code-group that is suggested by the corresponding protocol. For example, in 1000 BASE-T Ethernet the code groups K28.5, D05.6 and D16.2 are standard code groups.

However, in this exemplary embodiment, the nodes 102 replace the data symbols D05.6 and D16.2, respectively, with a non-standard code-group (i.e. a code-group that is not required or suggested by the protocol) that maintains the disparity and RLL. In other words, a code-group replacing D05.6 should contain 5 ones and a code-group replacing D16.2 should contain either 6 ones or 6 zeros depending on the running disparity. The replacement code-groups also cannot match a code-group reserved for other signaling. For example, 1000 BASE-T Ethernet states that the second code-group after the control symbol K28.5 cannot be data symbol D21.5 or D02.2 for idle signaling. Hence, the replacement code-groups do not include data symbol D21.5 or D02.2.

Since the minimum idle period in 1000 BASE-T Ethernet includes 5 idle ordered sets, 5 bytes of data can be transferred by replacing the second code-group (e.g. byte) in each of the 5 idle ordered sets. However, if the RLL and disparity are to be maintained, only 133 code-groups can be used to replace D05.6, and 122 groups can be used to replace D16.2. Even this reduced number of replacement code groups provides over 27 million possible values ($122^5$) if replacing the second code-group in each of the 5 idle ordered sets. Hence, using the replacement groups provides approximately 34 bits of data.

These idle bits can be used for error detection, error correction, and/or to use an encoding that simplifies circuit design in some embodiments. In other embodiments, other data is transmitted using the additional bits during the idle period. For example, in some embodiments, a reconstitution acknowledgment and/or status flag is signaled using the idle bits. Signaled reconstitution acknowledgments and status flags are described in more detail in co-pending U.S. application Ser. No. 13/401,365 filed on even date herewith) which is hereby incorporated by reference in its entirety. If only a portion of the 34 idle bits are used for transmitting data, such as a status flag for example, the remaining bits can be used for error detection or correction. Examples of uses of this out-of-band signaling include, but are not limited to, cooperation between physical layer (PHY) transmission (TX) and reception (RX) between nodes to dynamically adjust TX drive strength, preemphasis and equalization to provide a better RX signal; identification (signature) of signal source to ensure that signals are not misrouted (e.g. via incorrect cable connections or electrical shorts); indication of a frame's trustworthiness (e.g. result of a comparison in a fault-tolerant system); synchronization and handshaking signals; route history (where did the message come from in a multi-hop network); and buffer selection coordination in redundant components.

In addition, it is to be understood that the bits of the idle signal do not have to be adjacent to one another. For example, a portion of the bits can be sent during a first idle period and another portion of the bits of the idle signal can be sent during a second idle period. Thus, in some embodiments, the idle signal is segmented between a plurality of idle periods. The receiving nodes are configured to combine the bits from the different idle periods to form the complete idle signal.

In operation, after a node 102 completes transmission of a frame, it sends the end-of-frame code groups or delimiter to signal the end of the frame. After the end-of-frame code groups, the node 102 begins sending the minimum 5 idle ordered sets. However, the node 102 replaces the second code-group in each idle ordered set using one of the replacement code-groups which satisfies the 8B/10B encoding rules as described above. Each of the receiving nodes 102 is configured to analyze the second code-group rather than simply discarding the code-group as in conventional systems. However, if one of the receiving nodes 102 is not configured to analyze the second code-group, such receiving node 102 will continue to operate as in conventional systems and simply discard the second code-group. Thus, the additional bits are transparent to the Ethernet protocol and conventional nodes.

Although the embodiment described above implemented 1000 BASE-T Ethernet, it is to be understood that the technique of transmitting data during the idle period is also applicable to other Ethernet variants. For example, in some other embodiments, 100 BASE-X Ethernet is implemented. 100 BASE-X Ethernet uses 4B/5B encoding and specifies a minimum idle period of 22 idle code-groups for a total of 110 idle code-bits. IEEE 802.3 specifies that, for 100 BASE-X Ethernet, non-idle activity is detected upon receipt of two non-contiguous zeros within any 10 code-bits. Hence, in embodiments implementing 100 BASE-X Ethernet, nodes 102 are configured to transmit at least 8 ones after any sequence of one or more contiguous zeros. In other words, the nodes 102 are configured to transmit data in the idle period by interspersing groups of at least 8 contiguous ones in the data to be transmitted during the idle period such that any sequence of one or more contiguous zeros is followed by a group of at least 8 ones. The nodes 102 that receive the modified idle signal are configured to analyze the bits separated by the groups of at least 8 contiguous ones to interpret the data transmitted in the modified idle signal. Thus, in some embodiments, only 1 bit of each 10 bits is used in the idle period to transmit data. In such embodiments, 11 bits are available for this out-of-band or idle signaling. As used herein, out-of-band signaling refers to the transmission of data during an idle period.

In other embodiments, other techniques are used to transmit data during an idle period of 100 BASE-X Ethernet. For example, in some embodiments, 10 sequences of bits are sent. Each sequence has either no zeros, 1 zero, or 2 zeros followed by 9 ones. Hence, each sequence varies in length from 9 to 11 bits. This coding technique enables 59,049 (3^10) values, or approximately 15 bits, to be sent. In other embodiments, 6 sequences of bits are sent. Each sequence varies in length from 9 to 18 bits and contains 0 to 9 zeros followed by 9 ones. This coding technique enables 19 bits of data to be sent during the idle period. However, if the 4B/5B RLL is maintained, there can be no more than 3 zeros in a row. Thus, the total number of bits available to be sent is limited to 18 bits when the 4B/5B RLL is maintained.

In other embodiments, 10 BASE-T Ethernet is implemented. 10 BASE-T Ethernet uses Manchester encoding and has a minimum idle period of 96 bit-symbols. IEEE 802.3 specifies that for 10 BASE-T Ethernet any non-idle transmission which is less than a minimum length will be discarded without being reported as an error. The minimum length for a non-idle transmission according to IEEE 802.3 is greater than the minimum idle period of 96 bit-symbols. Hence, in embodiments implementing 10 BASE-T Ethernet, nodes 102 are configured to transmit bit sequences in an idle period that have length less than 96 bits. In this way, the out-of-band bit sequences will not be reported as errors. In addition, in some embodiments, the last bit-symbol of the idle period is reserved to ensure that the state of the medium 106 is high and the receiver nodes have detected an idle state. This leaves up to 95 bits available for out-of-band signaling in embodiments implementing 10 BASE-T Ethernet.

In some embodiments, mechanisms are used to increase the size of the idle period between frames or to shorten the preamble. In such embodiments, more bits are also available for the out-of-band signaling during an idle period. In addition, as described above, in some embodiments, the out-of-band signal is transmitted during a preamble period prior to the start of the frame rather than or in addition to during an idle period. Similar to the modified idle signals, the preamble signals are modified such that the preamble signals comply with the corresponding protocol rules for preamble signals yet are identifiable by the nodes 102 as containing data. Hence, the data transmitted during the preamble period does not interfere with the operation of network 100. Indeed, even if one of the nodes 102 is not configured to utilize or recognize data transmitted during the preamble period, that node 102 will continue to operate properly since the substituted patterns comply with the rules for patterns during the preamble period. Hence, the node not configured to interpret the modified portion of the preamble signal, processes the preamble signal according to the protocol as if the modified preamble signal were a conventional preamble signal.

For example, in 1000 BASE-T Ethernet, the preamble comprises eight bytes. In particular, the first byte is typically used as a start-of-packet and the next six bytes typically include an alternating pattern of ones and zeros to inform the receiving nodes 102 that a frame is coming. The last byte is the Start of Frame byte which signals to the receiving nodes 102 that the frame data starts in the next byte. Hence, the first and eighth bytes of the preamble are reserved. For example, in 1000 BASE-T Ethernet, the eighth byte of the preamble uses the data symbol D05 to signal the start of the frame. In such embodiments, the six bytes between the first and last byte of the preamble can be any data symbol except the data symbol D05.

The preamble can be used to transport various data without utilizing the bandwidth reserved for the frame data. For example, in some embodiments, a hop count, such as a message hop count or a hop count for any sync messages seen for clique resolution, is placed in the preamble. Alternatively, the hop counts can be included in the idle period as described above or a message hop count can be included in the preamble and a hop count for clique resolution can be included in the idle period. Additional details regarding hop counts are described in co-pending U.S. patent application Ser. No. 13/350,304 and co-pending U.S. patent application Ser. No. 13/401,365, both of which are hereby incorporated herein by reference.

One exemplary technique to prevent the message hop count from using the start of frame symbol D05 involves using bytewide counters in a network having fewer than 255 nodes. In one such embodiment, the message hop count starts at the data symbol D06 and rollovers are allowed (e.g. FF+1=0), but the message hop count stops at data symbol D04. In other words, this exemplary technique effectively adds D06 mod 256 to each count. This hop count can be mapped back to a 0 . . . FF range by subtracting D06 mod 256 from each hop count. This exemplary technique can be implemented using an unsigned byte initialized to D06, adding 1 or 2 (as appropriate) on each hop, for example, and then adding 2A to the final count before performing the reconstitution test described herein.

In another embodiment using bytewide counters in a network having fewer than 255 nodes, the hop count is "encrypted" before each transmission and "decrypted" after each reception by using an Exclusive OR operation (also referred to herein as XORing) on the hop count with 2B. By using the XOR operation, the data symbol D05 will be transmitted only when the count reaches FF. However, since this exemplary technique is used with a network having fewer than 255 nodes, the hop count does not reach a value of FF.

In other embodiments, the hop count is not a byte. For example, in some embodiments, the hop count comprises six bits. One exemplary technique to prevent the six-bit hop counters from equaling D05 is to do bit rearrangement and limit the number of nodes to less than 62. For example, in one such embodiment, six nodes can be used as one half of a timing master pair. These six nodes are represented as nodes A, B, C, D, E, and F in table 1, shown below. In table 1, the counter bits are labeled from 0 (the least significant bit or LSB) to 5 (the most significant bit or MSB). Thus, each node contributes 6 bits. In addition, in table 1 the letter M represents the hop count for whichever node is transmitting the current frame (Message) and X is used to represent 6 spare bits. Thus, table 1 represents one exemplary arrangement of the bits into 6 bytes to be used in the 6 bytes of the preamble discussed above.

TABLE 1

| Byte 1 | A5 | A4 | A0 | A3 | B0 | A2 | C0 | A1 |
| --- | --- | --- | --- | --- | --- | --- | --- | --- |
| Byte 2 | B5 | B4 | D0 | B3 | E0 | B2 | F0 | B1 |
| Byte 3 | C5 | C4 | M5 | C3 | M4 | C2 | M3 | C1 |
| Byte 4 | D5 | D4 | M2 | D3 | M1 | D2 | M0 | D1 |
| Byte 5 | E5 | E4 | X5 | E3 | X4 | E2 | X3 | E1 |
| Byte 6 | F5 | F4 | X2 | F3 | X1 | F2 | X0 | F1 |

If there are less than 62 nodes, the timing master hop counts can not be equal to 62 (62=111110) or 63 (63=111111) and the shaded bits in Table 1 can not be all ones within a byte. Thus, they can not be equal to D05. To indicate that this frame is a private self-checking pair handshake frame, M can be set to 62 or 63.

In another embodiment, as depicted in Table 1, the bit arrangement uses all 6 bytes between the first and last bytes of the preamble. By using all 6 bytes for this information, only the first byte (Byte 0) is left to be the real preamble pattern, which may be needed to establish DC levels and phase locking for Manchester-encoded Ethernets. Table 2 represents another exemplary bit arrangement which increases the preamble pattern from 8 bits to 14 bits by eliminating the spare (X) bits and rearranging the other bits.

TABLE 2

| Byte 1 | 0 | 1 | 0 | 1 | 0 | 1 | F5 | F1 |
| --- | --- | --- | --- | --- | --- | --- | --- | --- |
| Byte 2 | A5 | A4 | A0 | A3 | B0 | A2 | C0 | A1 |
| Byte 3 | B5 | B4 | D0 | B3 | E0 | B2 | F0 | B1 |
| Byte 4 | C5 | C4 | M5 | C3 | M4 | C2 | M3 | C1 |
| Byte 5 | D5 | D4 | M2 | D3 | M1 | D2 | M0 | D1 |
| Byte 6 | E5 | E4 | F4 | E3 | F3 | E2 | F2 | E1 |

By using the arrangement in Table 2, if it is determined that additional bits are needed, bits from the preamble pattern in byte 1 can be used, starting with the last bit of the pattern. The bit F5 is placed as the first bit after the preamble pattern because it has the highest probability of being 0 (vs. the other F bits), which extends the preamble pattern another bit. This probability is based on the probability that the network size is less than 32 nodes.

In another embodiment, the bits can be arranged so that propagation delay is only one clock tick (plus PHY delay) per node, for those Ethernet devices that process data one byte per clock and two clock ticks or for those Ethernet devices that process data one bit per clock. This exemplary bit arrangement is shown in Table 3 below.

TABLE 3

| Byte 1 | A5 | A4 | M1 | A3 | M0 | A2 | A0 | A1 |
| --- | --- | --- | --- | --- | --- | --- | --- | --- |
| Byte 2 | B5 | B4 | M3 | B3 | M2 | B2 | B0 | B1 |
| Byte 3 | C5 | C4 | M5 | C3 | M4 | C2 | C0 | C1 |
| Byte 4 | D5 | D4 | X1 | D3 | X0 | D2 | D0 | D1 |
| Byte 5 | E5 | E4 | X3 | E3 | X2 | E2 | E0 | E1 |
| Byte 6 | F5 | F4 | X5 | F3 | X4 | F2 | F0 | F1 |

The propagation delay can be made this low because each of the timing Master's hop counts appear within a single byte and the hop count is sent LSB first.

The relay logic of each node is configured to know which of the timing master hop-count fields should be incremented. In addition, a value, such as 61, can be reserved to indicate an empty field (e.g. the associated timing master has not sent a frame within a predetermined elapsed time). Using a value of 61 limits the total number of nodes to 61. When a timing master sends a frame, it sets its hop count to zero and all other timing master hop counts to 61.

In addition, in Manchester-encoded Ethernet implementations an explicit idle signal is not sent. Rather, the sending of Manchester bits is stopped. Hence, for some embodiments of Manchester-encoded Ethernet, one bit-time with no transmission after each frame is reserved to ensure that the receiving nodes know where the end of frame is. Then, a burst of bits that has the out-of-band signaling is sent. For example, the burst of bits can comprise a standard (or shortened) preamble followed by the out-of-band signal, which can be used for hop count fields or other data as described herein, followed by an idle. Because there was no start of frame in the burst of bits, a standard receiving node would throw these bits away. This arrangement enables a total of 48 data bits plus up to 48 bits of actual preamble plus 2 bits of actual idle, which is 2 bits beyond the 96 bit minimum inter-frame gap for Manchester-encoded Ethernet. The time it takes to send out-of-band signal bits can be shortened by using some encoding that is more efficient than Manchester during the out-of-band period.

As mentioned above, the out-of-band signals can be used for clique resolution. An exemplary technique for clique resolution is described in more detail in U.S. Pat. No. 7,656,881 (the '881 patent) which is hereby incorporated herein by reference. For example, the '881 patent discusses breakthrough messages transmitted during breakthrough slots to validate a synchronization message and resolve cliques. In some embodiments, the out-of-band signal is used to transmit breakthrough messages in lieu of a breakthrough timeslot. Therefore, the use of out-of-band signals enables the transmission of breakthrough messages without a dedicated timeslot or time dependency. The out-of-band signal can be used to send a pair's priority and hop count for the breakthrough message. Hence, the out-of-band signals enable asynchronous signaling across time division multiple access (TDMA) cliques.

In addition, when a node forwards an out-of-band signal, such as a breakthrough message, the node can be configured, in some embodiments, to alternate or otherwise vary the port selection for the source of the out-of-band signal. For example, in a braided ring network described below, the node can alternate between forwarding the out-of-band signal received on a skip link and forwarding the out-of-band signal received on the direct link in the same direction. This alternation creates a type of fairness protocol that prevents active node failures from consuming too much bandwidth.

Figure 2:
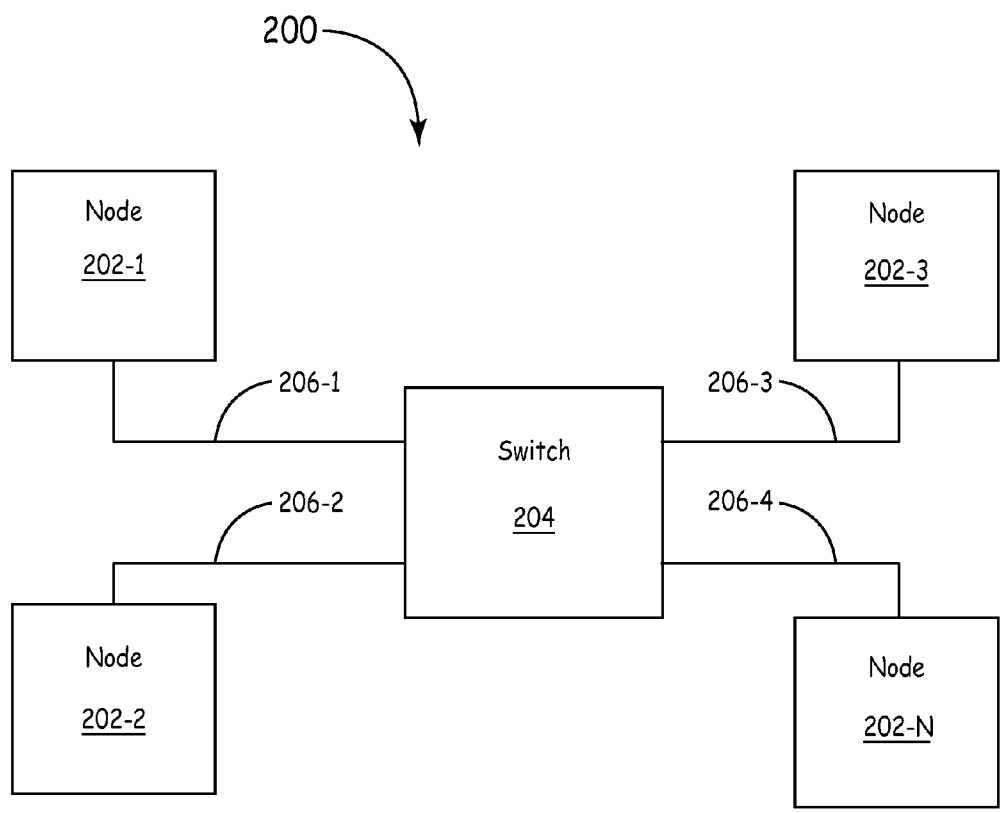
FIGS. 2-5 are block diagrams of embodiments of other exemplary network topologies.

Furthermore, although network 100 has been described above with respect to a bus topology, it is to be understood that the techniques described herein can be implemented in other network topologies, such as those shown in FIGS. 2-5. For example, FIG. 2 depicts a network 200 in a star topology. Network 200 includes a switch 204. Each node 202 is coupled to the switch 204 via a corresponding dedicated link or segment 106. Hence, each of the nodes 202 communicates with other nodes 202 via the switch 204.

Figure 3:
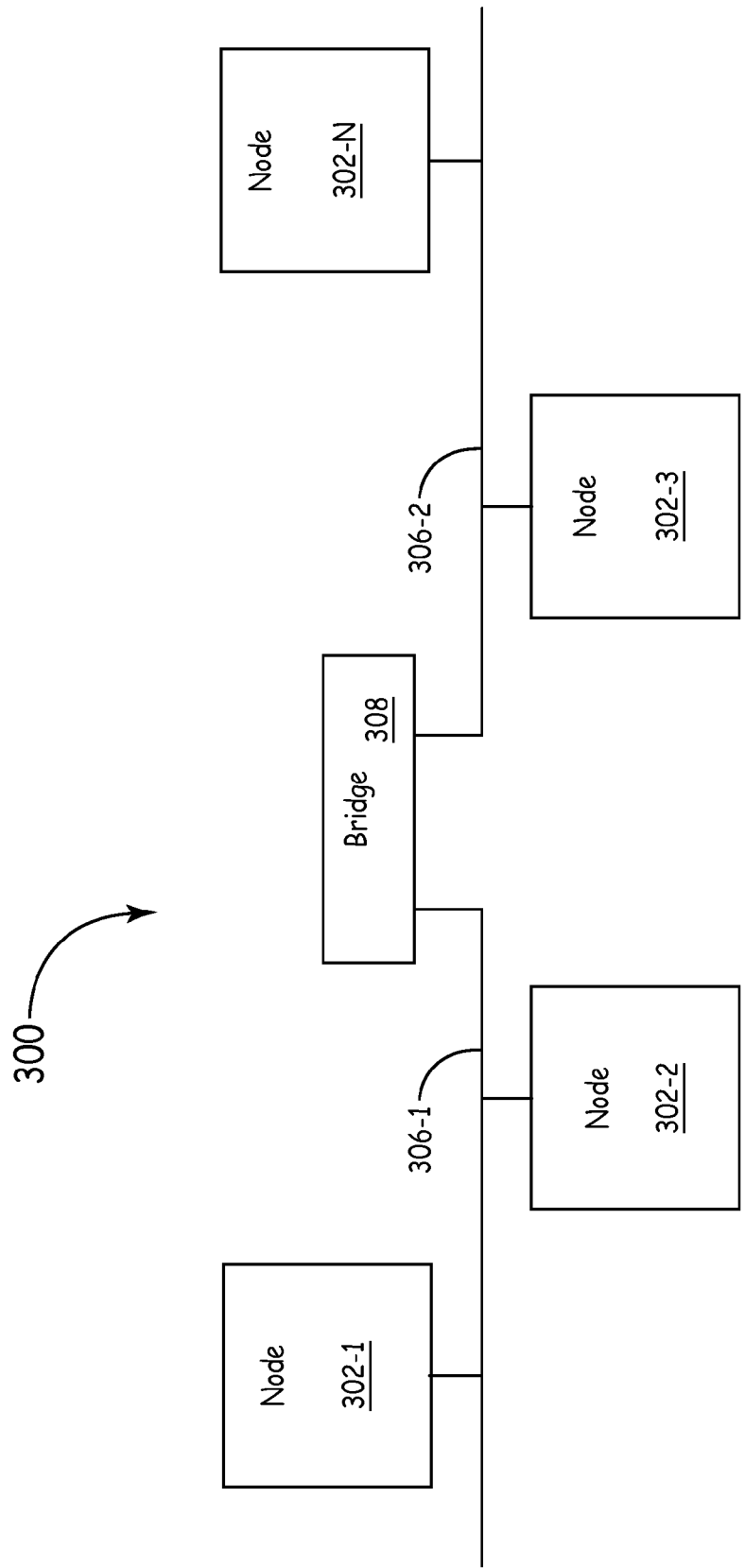

FIG. 3 is a block diagram of a network 300 having a bridge 308 that couples two bus segments 306-1 and 306-2 together. The bridge 308 is configured to control traffic on the bus segments 306-1 and 306-2 by not forwarding frames from one bus segment 306-1/306-2 to the other bus segment 306-2/306-1 unless the frame is intended for a node on the other bus segment 306-2/306-1.

Figure 4:
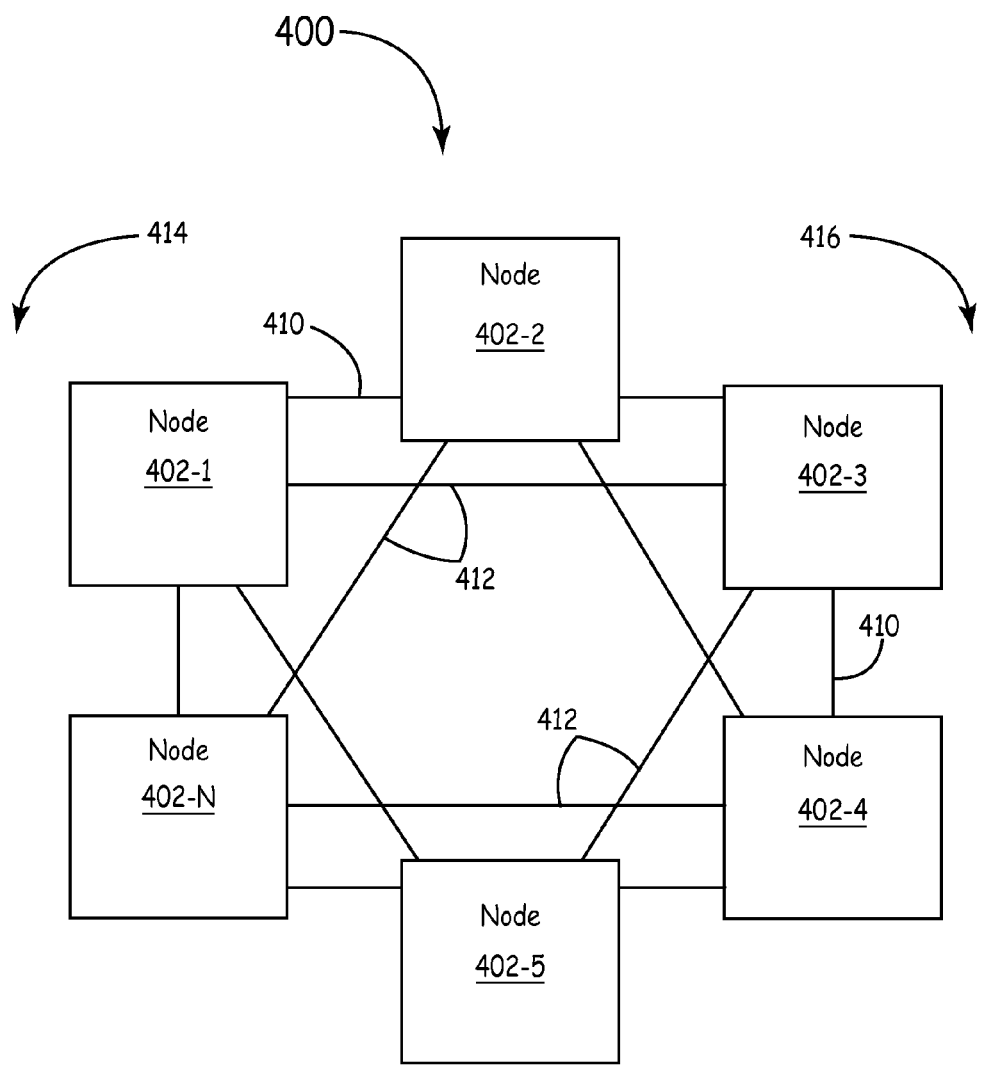
Figure 5:
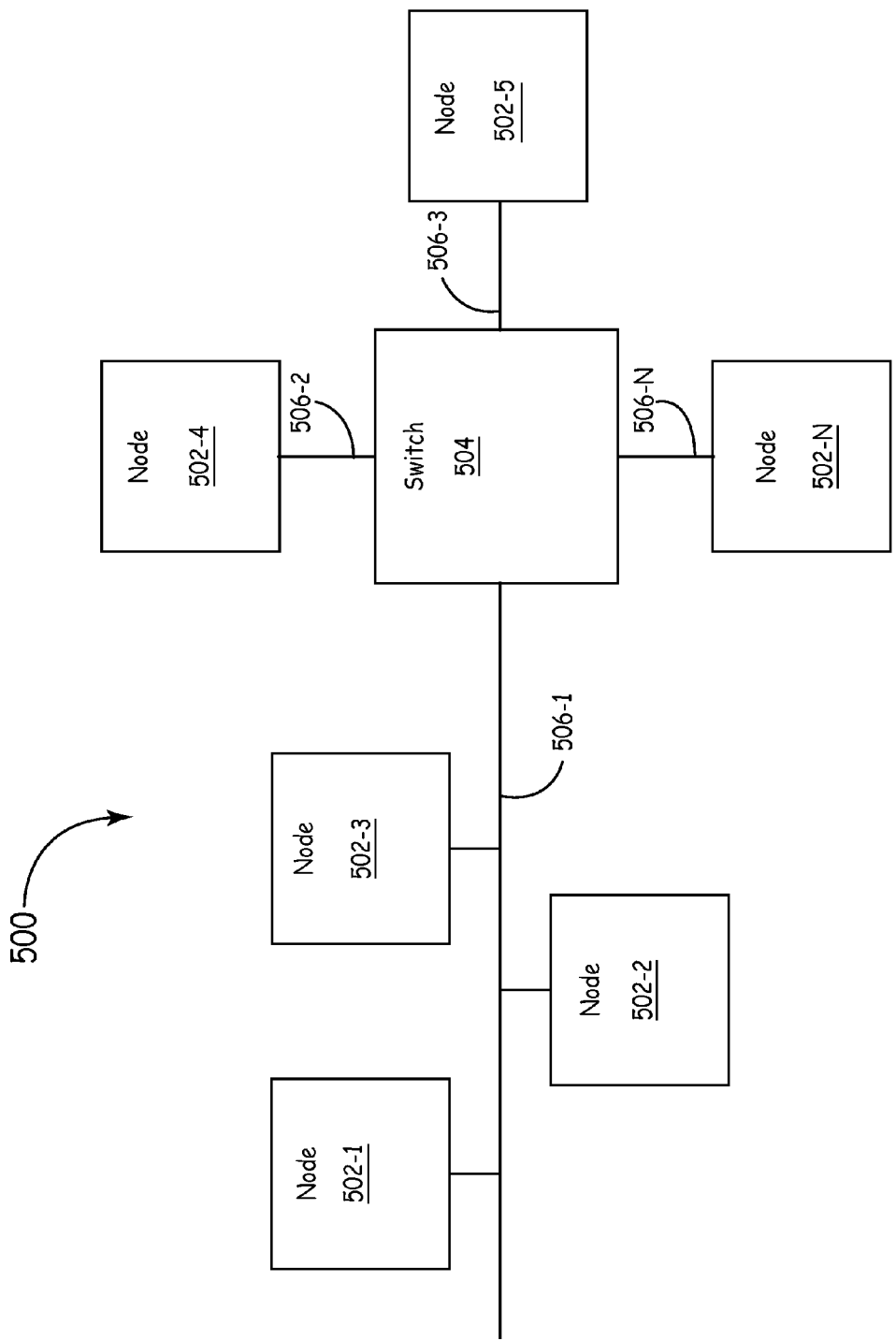

FIG. 4 is a block diagram of a braided ring network 400. Network 400 includes a plurality of nodes 402-1 . . . 402-N. Each of the nodes 402 is coupled to each of its immediate or adjacent neighbors (also referred to herein as "direct neighbors", "adjacent nodes", or "neighbor nodes") via respective direct links 410 and to each of its direct neighbor's neighbor (also referred to herein as "skip neighbors", "skip nodes", or "neighbor's neighbor nodes") via respective skip links 412. Thus, each node 402 in the exemplary network 100 has two "neighbor" nodes 402, one in the clockwise direction (also referred to here as the "clockwise neighbor node" or "clockwise neighbor") and one in the counter-clockwise direction (also referred to here as the "counter-clockwise neighbor node" or "counter-clockwise neighbor").

The links 410 and 412 are used to form at least two logical communication channels. In the particular embodiment shown in FIG. 4, the first logical communication channel 414 comprises a communication path around the ring in a first direction (for example, in a counter-clockwise direction), and the second logical communication channel 416 comprises a communication path around the ring in a second direction (for example, in a clockwise direction). Each node 402 of the network 400 is communicatively coupled to at least one of channels 414 and 416.

It is to be understood that the topologies described above are provided by way of example and not by way of limitation. For example, the topologies described above can be combined in some examples, such as in network 500 shown in FIG. 5. Network 500 comprises a first network portion implementing a star topology including nodes 502-4, 502-5 and 502-N. Network 500 also includes a second network portion implementing a bust topology and including nodes 502-1, 502-2, and 502-3.

Figure 6:
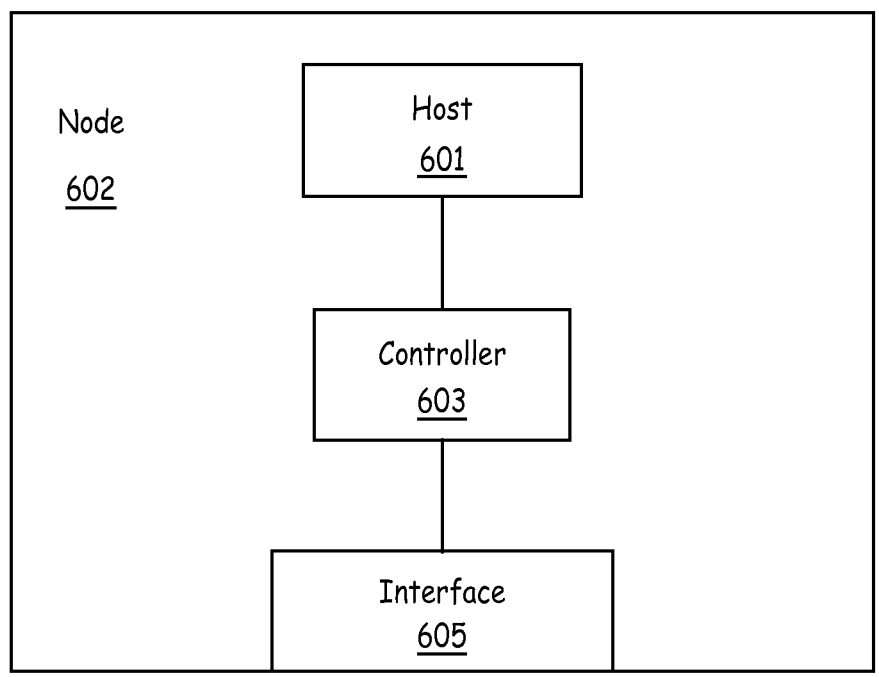
FIG. 6 is a block diagram of one embodiment of a node.

FIG. 6 is a block diagram of one embodiment of a node 602. Node 602 includes a host 601 that executes computer readable instructions which provides and uses the data that is communicated over a network such as network 100. For example, in one implementation, the host 601 is a microprocessor executing a safety-critical control application. The host 601 communicates with the other nodes in the cluster network using a communication controller 603 that implements protocol logic (for example, encoding rules, idle periods, startup, error, and message handling) for an Ethernet technology as described above. In particular, the controller 603 is configured to transmit out-of-band signaling and analyze received out-of-band signaling as described above. The node 602 also includes an interface 605 that couples the node 602 to the communication media such as medium 106. The interface includes one or more ports and drivers for transmitting and receiving signals as directed by the controller 603.

Figure 7:
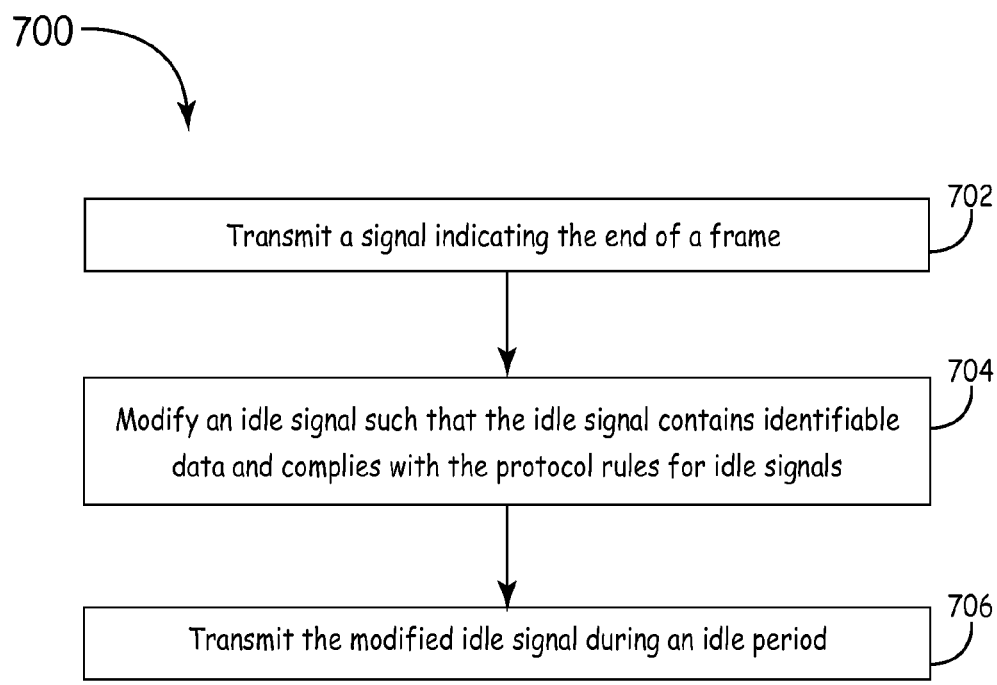
FIG. 7 is a flow chart depicting one embodiment of a method of communicating data during an idle period.

FIG. 7 is a flow chart depicting one embodiment of a method 700 of communicating data during an idle period. Method 700 can be implemented in a communication controller of a node, such as communications controller 603 discussed above. At block 702, a signal indicating the end of a frame is transmitted over a communication medium in accordance with a protocol for communicating data over the medium. For example, an end-of-frame delimiter can be transmitted as discussed above. The signal indicates to the other nodes coupled to the communication medium that the transmission of the frame has completed and that an idle period is to follow.

At block 704, an idle signal is modified such that the idle signal contains data identifiable by at least one other node configured to identify data in the idle signal. The idle signal is also modified in a manner that a node not configured to identify data in the idle signal processes the idle signal in accordance with the protocol. In other words, the node not configured to identify the data will treat the modifying signal as a conventional idle signal which does not contain data. For example, in some protocol implementations, conventional nodes are configured to simply discard the idle signal. That is, nodes configured to identify the data will identify the data and nodes not configured to identify the data will discard the idle signal in such embodiments. Therefore, the modified idle signal does not interfere with operation of conventional nodes not configured to use the techniques described herein.

In some embodiments, the communication protocol is a 1000 BASE-T Ethernet protocol. In some such embodiments, modifying the idle signal comprises inserting a code group that maintains disparity and maximum run length limit into at least one idle ordered set of the idle signal. The inserted code group contains a pattern of ones and zeros identifiable by nodes configured to identify data in the idle signal. For example, the nodes can be configured with a list of the code groups which are used for communicating data.

In other embodiments, the communication protocol is a 100 BASE-X Ethernet protocol. In some such embodiments, modifying the idle signal comprises interspersing groups of at least 8 contiguous ones in data to be transmitted during the idle period to form the modified idle signal. In particular, as described above, a group of 8 or more contiguous ones is inserted after each occurrence of one or more contiguous zeros, as described above. In this way, the idle signal complies with the protocol rules for idle signals. Nodes configured to identify data in the idle signal are configured to ignore the groups of at least 8 contiguous ones in order to identify the data transmitted in the idle signal. However, nodes not configured to identify data will process the idle signal as if it contained no data in accordance with the protocol. In particular, the nodes not configured to identify the data discard the idle signal.

In other embodiments, the communication protocol is a 10 BASE-T Ethernet protocol. In such embodiments, modifying the idle signal comprises modifying bit sequences that have a length less than 96 bits to contain data identifiable by that at least one other node. Thus, as long as the bit sequences do not exceed 96 bits in length, nodes not configured to identify the data will treat the idle signal as a conventional idle signal. However, nodes configured to identify the data will analyze the bit sequences to identify the data transmitted in the bit sequences. After modifying the idle signal, the modified idle signal is transmitted over the communication medium during an idle period in accordance with the communication protocol at block 706.

It is to be understood that, although FIG. 7 is described with respect to an idle signal in an idle period, the method 700 can also be applied to a preamble signal in a preamble period. For example, in lieu of transmitting the modified idle signal after transmission of a signal indicating the end of a frame, a modified preamble can be transmitted prior to the transmission of a signal indicating the start of a frame, as described above. In either case, the out-of-band signal is modified to comply with the protocol rules such that a node not configured to identify the data in the out-of-band signal processes the out-of-band signal in accordance with the protocol. Hence, the modification of the out-of-band signal is transparent to such nodes.

The out-of-band signaling embodiments described above can be used for various applications such as fault tolerance and as a mechanism to compensate for imperfections in the transmission line that connects one physical device (PHY) to another. For example, many conventional high-speed digital network PHY devices include mechanisms to compensate for imperfections in the transmission line that connects one PHY to another. This is often done with pre-emphasis in the transmitting PHY and equalization in the receiving PHY. The receiving PHY can adjust its equalization parameters automatically because it can see what the transmission line imperfections have done to the signal. However, in conventional network PHY devices, the transmitting PHY cannot automatically adjust its pre-emphasis settings because it does not know what imperfections exist in the transmission line. Hence, in a conventional network, pre-emphasis settings are often adjusted manually or by some mechanism and communication path outside of the PHYs' digital network.

In some embodiments of the present invention, however, a receiving PHY that knows what the transmission line imperfections are can convey the imperfection information back to the transmitting PHY, via an out-of-band signal, for example. The transmitting PHY is then able to adjust its pre-emphasis. Hence, such embodiments enable continuous dynamic re-adjustment of the pre-emphasis parameters to compensate for transmission lines that have imperfection characteristics which drift over time.

Although specific embodiments have been illustrated and described herein, it will be appreciated by those of ordinary skill in the art that any arrangement, which is calculated to achieve the same purpose, may be substituted for the specific embodiments shown. For example, although specific Ethernet protocols are discussed above for purposes of explanation, it is to be understood that other protocols can be implemented in other embodiments. Therefore, it is manifestly intended that this invention be limited only by the claims and the equivalents thereof.

What is claimed is:

1. A communication network comprising:
a communication medium; and
a plurality of nodes, each node configured to communicate with the other nodes via the communication medium using a protocol that has a preamble period prior to start of transmission of a frame;
wherein at least one node of the plurality of nodes is configured to transmit an out-of-band signal during the preamble period;
wherein the at least one node is configured to modify at least a portion of the out-of-band signal to communicate data to at least one other node;
wherein the modified out-of-band signal transmitted during the preamble period comprises an initial portion, a middle portion, and an end portion; the initial portion and the end portion comprising one or more reserved values based on the protocol's encoding rules;
wherein the middle portion is modified to communicate data without using the reserved values of the initial portion or the end portion;
wherein the at least one other node is configured to interpret the modified portion of the out-of-band signal to identify the data communicated in the modified out-of-band signal;
wherein the modified out-of-band signal complies with the protocol's encoding rules such that any node not configured to interpret the modified portion of the out-of-band signal processes the modified out-of-band signal according to the protocol.

2. The communication network of claim 1, wherein each of the nodes is configured to communicate via the communication medium using 1000BASE-T Ethernet; wherein the at least one node is configured to modify an idle signal by replacing a standard second code group in at least one idle ordered set with a non-standard code group that maintains disparity and maximum run length limit of the idle signal.

3. The communication network of claim 1, wherein the at least one node is configured to modify a preamble signal to include a hop count in the modified portion of the out-of-band signal.

4. The communication network of claim 3, wherein the number of nodes in the communication network is limited to prevent the use of the reserved values in the hop count included in the modified portion of the out-of-band signal.

5. The communication network of claim 1, wherein each of the nodes is configured to communicate via the communication medium using 100BASE-X Ethernet;
wherein the at least one node is configured to modify an idle signal by interspersing groups of 8 or more contiguous ones after each occurrence of one or more contiguous zeros in data to be transmitted during the idle period to form a modified idle signal;
wherein the at least one other node is configured to analyze the bits separated by the groups of 8 or more contiguous ones to identify the data transmitted by the at least one node during the idle period.

6. The communication network of claim 1, wherein each of the nodes is configured to communicate via the communication medium using 10BASE-T Ethernet.

7. The communication network of claim 6, wherein the at least one node is configured to modify an idle signal by transmitting bit sequences during the idle period that have a length less than 96 bits.

8. The communications network of claim 1, wherein the communication medium is comprised of a plurality of segments, each segment coupling one node to another node.

9. The communication network of claim 1, wherein the at least one node of the plurality of nodes is configured to transmit a breakthrough message used for clique resolution in the out-of-band signal during the preamble period.

10. The communication network of claim 1, wherein the at least one node of the plurality of nodes is configured to transmit transmission line imperfections in the out-of-band signal during at least one of the idle period or the preamble period.

11. The communication network of claim 1, wherein the at least one other node is configured to forward the out-of-band signal;
wherein the at least one other node is further configured to vary a port selection for a source of the forwarded out-of-band signal.

12. A communication node comprising:
a host configured to execute computer readable instructions;
an interface configured to couple the node to a communication medium; and
a communication controller coupled to the host and the interface, the communication controller configured to communicate frames from the host over the communication medium via the interface in accordance with a protocol having a preamble period prior to start of transmission of a frame;
wherein the communication controller is configured to modify and transmit an out-of-band signal during the preamble period such that the out-of-band signal both complies with the protocol's rules and communicates data that is identifiable by at least one other node coupled to the communication medium;
wherein the communication controller is configured to modify the out-of-band signal such that any node not configured to identify the data in the out-of-band signal processes the out-of-band signal in accordance with the protocol;

wherein the modified out-of-band signal transmitted during the preamble period comprises an initial portion, a middle portion, and an end portion; the initial portion and the end portion comprising one or more reserved values based on the protocol's encoding rules;

wherein the communication controller is configured to modify the middle portion to communicate data without using the reserved values of the initial portion or the end portion.

13. The node of claim 12, wherein the communication controller is configured to communicate frames in accordance with a 1000BASE-T Ethernet protocol.

14. The node of claim 13, wherein the communication controller is configured to replace a standard second code group in at least one idle ordered set of an idle signal with a non-standard code group that maintains disparity and maximum run length limit of the idle signal.

15. The node of claim 12, wherein the communication controller is configured to communicate frames in accordance with a 100BASE-X Ethernet protocol; wherein the communication controller is configured to modify an idle signal by interspersing groups of 8 or more contiguous ones after each occurrence of one or more contiguous zeros in data to be transmitted during an idle period.

16. The node of claim 12, wherein the communication controller is configured to communicate frames in accordance with a 10BASE-T Ethernet protocol; wherein the communication controller is configured to transmit bit sequences during an idle period that have a length less than 96 bits, the bit sequences containing data identifiable by that at least one other node.

17. A method of communicating data during an out-of-band period, the out-of-band period comprising a preamble period prior to start of transmission of a frame, the method comprising:

modifying an out-of-band signal such that the out-of-band signal contains data identifiable by at least one other node configured to identify data in the out-of-band signal and such that a node not configured to identify data in the out-of-band signal processes the out-of-band signal in accordance with the protocol; and transmitting the out-of-band signal during an out-of-band period;

wherein the modified out-of-band signal transmitted during the preamble period comprises an initial portion, a middle portion, and an end portion; the initial portion and the end portion comprising one or more reserved values based on the protocol's encoding rules;

wherein the middle portion is modified to communicate data without using the reserved values of the initial portion or the end portion.

18. The method of claim 17, wherein modifying the out-of-band signal comprises:

inserting a code group that maintains disparity and maximum run length limit of an idle signal in at least one idle ordered set of the idle signal, wherein the inserted code group contains a pattern of ones and zeros identifiable by the at least one other node as containing data.

19. The method of claim 17, wherein modifying the out-of-band signal comprises interspersing groups of 8 or more contiguous ones after each occurrence of one or more contiguous zeros in data to be transmitted during an idle period to form the modified out-of-band signal.

20. The method of claim 17, wherein modifying the out-of-band signal comprises modifying bit sequences that have a length less than 96 bits to contain data identifiable by the at least one other node.

* * * * *